(12) United States Patent
Matsubara et al.

(10) Patent No.: US 8,197,385 B2
(45) Date of Patent: Jun. 12, 2012

(54) CONTROL DEVICE FOR VEHICULAR POWER TRANSMITTING DEVICE

(75) Inventors: Tooru Matsubara, Toyota (JP); Hiroyuki Shibata, Toyota (JP); Kenta Kumazaki, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 979 days.

(21) Appl. No.: 12/219,200

(22) Filed: Jul. 17, 2008

(65) Prior Publication Data

US 2009/0029825 A1 Jan. 29, 2009

(30) Foreign Application Priority Data

Jul. 23, 2007 (JP) ................. 2007-191398

(51) Int. Cl.
*H02P 17/00* (2006.01)
(52) U.S. Cl. ............. 477/15; 903/945; 180/65.31
(58) Field of Classification Search ........... 477/3, 15–17; 903/903, 906, 944, 945; 180/65.21, 65.265, 180/65.275, 65.287, 65.29, 65.31
See application file for complete search history.

(56) References Cited

U.S. PATENT DOCUMENTS 6,809,429 B1 * 10/2004 Frank .................. 290/40 C
7,848,867 B2 * 12/2010 Ueno ................. 701/70

FOREIGN PATENT DOCUMENTS

| JP | A-9-9414 | 1/1997 |
| JP | A-2005-212595 | 8/2005 |
| JP | A-2006-2913 | 1/2006 |

OTHER PUBLICATIONS

Japanese Office Action dated Aug. 9, 2011 in Japanese Patent Application No. 2007-191398 (with partial translation).
Jan. 17, 2012 Office Action issued in Japanese Patent Application No. 2007-191398 w/translation.

* cited by examiner

*Primary Examiner* — Justin Holmes
(74) *Attorney, Agent, or Firm* — Oliff & Berridge, PLC

(57) ABSTRACT

This invention relates to a control device for a vehicular power transmitting device. The control device has shifting-point altering means 108 operative such that when a second electric motor M2 is operated with priority to obtain a charging efficiency and/or electric power generating efficiency, a shifting point for a vehicle to run under a decelerating state (during a coast running state) is altered to a point on a higher vehicle speed than that at which a shifting point for a running-performance-conscious state is set. Therefore, when the second electric motor M2 is operated with priority for generating electric power, a downshift is initiated at a high vehicle speed than that at which the downshift is initiated at a shifting point for a running-performance-conscious state. This increases a rotation speed $N_{M2}$ of the second electric motor M2, resulting in an increase in regeneration amount (electric power generation amount) of the second electric motor M2.

10 Claims, 8 Drawing Sheets

| | C0 | C1 | C2 | B0 | B1 | B2 | B3 | SHIFTING RATIO | STEP |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | TOTAL 4.76 |
| N | | | | | | | | | |

○ ENGAGED
◎ ENGAGED UPON STEP-VARIABLE
   RELEASED UPON CONTINUOUSLY-VARIABLE

CONTROL DEVICE FOR VEHICULAR POWER TRANSMITTING DEVICE

TECHNICAL FIELD

The present invention relates to a control device for a vehicular power transmitting device having a shifting portion forming part of a power transmitting path between the drive-force source and drive wheels and an electric motor connected to the power transmitting path. More particularly, it relates to a technology of performing a regeneration control for a coast running mode to achieve an increased regeneration amount and drivability in compatibility.

BACKGROUND ART

There has been known a control device for a vehicular power transmitting device including a shifting portion forming part of a power transmitting path between the drive-force source and drive wheels, and an electric motor connected to an input of the shifting portion. For instance, Patent Publication 1 (Japanese Patent Application Publication No. 2006-2913) discloses such a vehicular power transmitting device of a hybrid type. With the control device disclosed in Patent Publication 1, a differential gear device is provided with a switching device with which the differential gear device is properly switched to a differential state or a locked state, thereby preventing the electric motor from reaching a high-speed rotation while enabling regeneration to be achieved with increased efficiency.

Meanwhile, with hybrid type vehicular power transmitting devices including that disclosed in patent Publication 1, the downshift point for the vehicle to run under the decelerating state (during the coast running state) is normally set to a shifting point that prevents occurrences of shifting shock and regeneration torque escape caused by the shifting. In particular, the down shift point for the coast running mode is set such that with a view to avoiding the occurrences of shifting shock and the regeneration torque escape, the downshift point is set to a non-drive region of the vehicle or a region in close proximity to the non-drive region. FIG. 11 is a conceptual view showing the relationship between the vehicle speed and a drive force of the vehicle.

As shown in FIG. 11, negative torque is present in a high vehicle speed region due to regeneration torque. On the contrary, positive drive torque occurs in a low vehicle speed region due to creep torque occurring when controlling, for instance, the electric motor. The vehicle has a non-drive region in close proximity to a boundary point between a regenerating torque region and a creep torque region. The downshift point is set to the non-drive region, thereby suppressing the occurrence of shifting shock during the shifting state and regeneration torque escape.

Since such a downshift point lays in a relatively low vehicle speed region, the output shaft of the shifting portion has a low rotation sped, with accompanying decrease in rotation speed of the electric motor during the regeneration mode. In addition, due to limited torque of the electric motor, the electric motor can hardly obtain adequate regeneration amount (electric power generation amount). Especially, under a circumstance like a case wherein a drop occurs in, for instance, the charge capacity, there is a need for immediately recovering the charge capacity, and under such a situation, a need arises for the electric motor to increase the regeneration amount.

SUMMARY OF THE INVENTION

The present invention has been completed with such a view in mind, and has an object to provide a control device for a vehicular power transmitting device, having a shifting portion forming part of a power transmitting path between a drive-force source and drive wheels, and an electric motor connected to the shifting portion at an input side thereof, which can achieve an increase in regeneration amount in regeneration control executed during a coast running mode and driveability in compatibility.

For achieving the above object, in a first aspect of the invention relates to a control device for a vehicular power transmitting device, wherein the vehicular power transmitting device comprises a shifting portion forming part of a power transmitting path between a drive-force source and drive wheels, an electric motor connected to the shifting portion at an input side thereof, and regeneration control means operative to cause the electric motor to generate electric power during a vehicle running under a decelerating state.

The control device includes shifting-point altering means operative to alter, when the electric motor is operated with priority for a charging and/or electric power generation, a shifting point for the vehicle running under a decelerating state to a point on a higher vehicle speed than that at which a shifting point for a running-performance conscious state is set.

In a second aspect of the invention, a case in which the electric motor is operated with priority to perform the charging and/or the electric power generation refers to a phase in which a charge capacity is less than a given value.

In a third aspect of the invention, a case in which the electric motor is operated with priority to perform the charging and/or the electric power generation refers to a phase in which the vehicle remains in an electrical drive mode.

In a fourth aspect of the invention, a case in which the electric motor is operated with priority to perform the charging and/or the electric power generation refers to a phase in which the vehicle has an increasing electrical load.

In a fifth aspect of the invention, the shifting point effectuated with the control device is a downshift point of the shifting portion.

In a sixth aspect of the invention, the vehicular power transmitting device further comprises an electrically controlled differential portion, disposed between the drive-force source and the drive wheels, which is operative to control an operating state of a control electric motor for thereby controlling a differential state between a rotation speed of an input shaft and a rotation speed of an output shaft, and the output shaft is connected to the shifting portion at the input side thereof.

In a seventh aspect of the invention, the shifting portion of the vehicular power transmitting device includes a step-variable automatic shifting portion.

In an eighth aspect of the invention, the electrically controlled differential portion of the vehicular power transmitting device operates to act as a continuously variable shifting mechanism.

With the control device for the vehicular power transmitting device according to the first aspect of the present invention, the control device includes shifting-point altering means operative such that when the electric motor, is operated with priority for the charging and/or the electric power generation, the shifting point for the vehicle running under the decelerating state is altered to the point on the higher vehicle speed than that at which the shifting point for the running-performance-conscious state is set. That is, the shifting-point altering means alters the shifting point for the vehicle running under the decelerating state to another point on the higher vehicle speed than that at which the shifting is initiated on the shifting point for the running-performance-conscious state.

When the electric motor is operated with priority for the charging and/or the electric power generation, the downshift is effectuated on a higher vehicle speed than that at which the shifting point is set for the running-performance-conscious state. This allows a rotation speed of the shifting portion at the input side thereof to increase on an earlier stage than that on which the rotation speed of the shifting portion increases. This can increase in the rotation speed of the electric motor connected to the shifting portion at the input side thereof, with an accompanying increase in the regeneration amount to be achieved with the electric motor.

Further, if no operation of the electric motor is executed with priority for the charging and/or the electric power generation, the downshift is effectuated at the shifting point for the running-performance-conscious state. This prevents the occurrence of a shifting shock and a regeneration torque escape during the shifting mode. With the shifting-point altering means operated to properly alter the shifting point, an increase in regeneration amount of the electric motor and drivability can be balanced.

With the control device for the vehicular power transmitting device according to the second aspect of the present invention, the case in which the electric motor is operated with priority to perform the charging and/or the electric power generation refers to the phase in which the charge capacity is less than the given value. If the charge capacity becomes less than the given value, the shifting point is altered to the shifting point on a high vehicle speed region with an accompanying increase in regeneration amount. This enables the charge capacity to be rapidly recovered.

With the control device for the vehicular power transmitting device according to the third aspect of the present invention, the case in which the electric motor is operated with priority to perform the charging and/or the electric power generation refers to the phase in which the vehicle remains in the electrical drive mode. Thus, increasing the regeneration amount can minimize electric power consumption caused during the electrical drive mode.

With the control device for the vehicular power transmitting device according to a fourth aspect of the present invention, the case in which the electric motor is operated with priority to perform the charging and/or the electric power generation refers to the phase in which the vehicle has the increasing electrical load. Thus, increasing the regeneration amount and/or the charging amount can reduce electrical load (electric power consumption).

With the control device for the vehicular power transmitting device according to the fifth aspect of the present invention, the shifting point effectuated with the control device is the downshift point of the shifting portion. This allows the downshift to be effectuated in the shifting portion during the regeneration mode, causing an increase in rotational speed of the shifting portion at the input side thereof. This can increase in the rotation speed of the electric motor, with an accompanying increase in the regeneration amount.

With the control device for the vehicular power transmitting device according to the sixth aspect of the present invention, the vehicular power transmitting device further comprises the electrically controlled differential portion disposed between the drive-force source and the drive wheels. The electrically controlled differential portion is operative to control the operating state of the controlling electric motor for thereby controlling the differential state between the rotation speed of the input shaft and the rotation speed of the output shaft which is connected to the shifting portion at the input side thereof. Therefore, initiating the downshift in the shifting portion can increase in the rotation speeds of the input side of the shifting portion and the output shaft of the electrically controlled differential portion. This causes the rotation speed of the electric motor to increase, with an accompanying increase in the regeneration amount. In addition, controlling the controlling electric motor can properly control the rotation speeds of the various rotary elements of the electrically controlled differential portion.

With the control device for the vehicular power transmitting device according to the seventh aspect of the present invention, the shifting portion of the vehicular power transmitting device includes the step-variable automatic shifting portion. Therefore, if the vehicle state comes to the downshift point, then the automatic shifting is initiated with an accompanying increase in speed ratio. With such an increase in speed ratio, the rotation speed of the input side of the shifting portion increases, thereby causing the electric motor to have an increased regeneration amount.

With the control device for the vehicular power transmitting device according to the eighth aspect of the present invention, the electrically controlled differential portion of the vehicular power transmitting device is rendered operative to act as the continuously variable shifting mechanism. This enables drive torque to be smoothly varied. In addition, the electrically controlled differential portion has functions not only to operate as the electrically controlled continuously variable transmission to obtain a continuously variable speed ratio, but also to operate as the step-variable transmission with the speed ratio varied step-by-step. Thus, the vehicular power transmitting device can achieve the various gear positions step-by-step, enabling drive torque to be rapidly obtained.

BEST MODE FOR CARRYING OUT THE INVENTION

Now, various embodiments of the present invention will be described below in detail with reference to accompanying drawings.

Embodiment

Figures 1, 2:
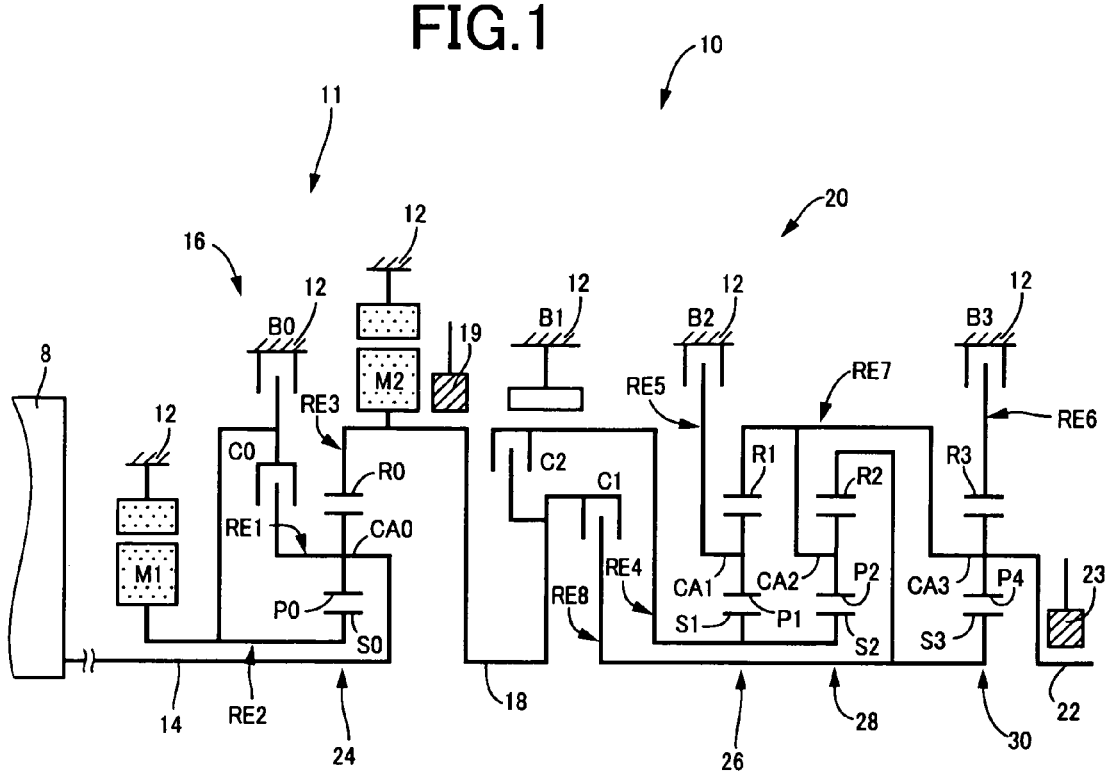
FIG. 1 is a skeleton view explaining a structure of a hybrid vehicle drive apparatus to which one embodiment of the present invention is applied.
FIG. 2 is an engagement operation table illustrating the relationship between a shifting operation, in which the hybrid vehicle drive apparatus, shown in FIG. 1, is placed in a continuously variable or step-variable shifting state, and the operation of a hydraulic-type frictional engaging device in combination.

FIG. 1 is a skeleton view illustrating a shifting mechanism 10, forming part of a drive apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion 20 connected via a power transmitting member (transmission shaft) 18 in series through a power transmitting path between the differential mechanism 11 and drive wheels 38 (see FIG. 6) to serve as a step-variable type transmission, and an output shaft 22 connected to the automatic shifting portion 20 as an output rotary member. All of them are disposed in a transmission casing 12 (hereinafter briefly referred to as a "casing 12") serving as a non-rotary member connectedly mounted on a vehicle body.

Figure 6:
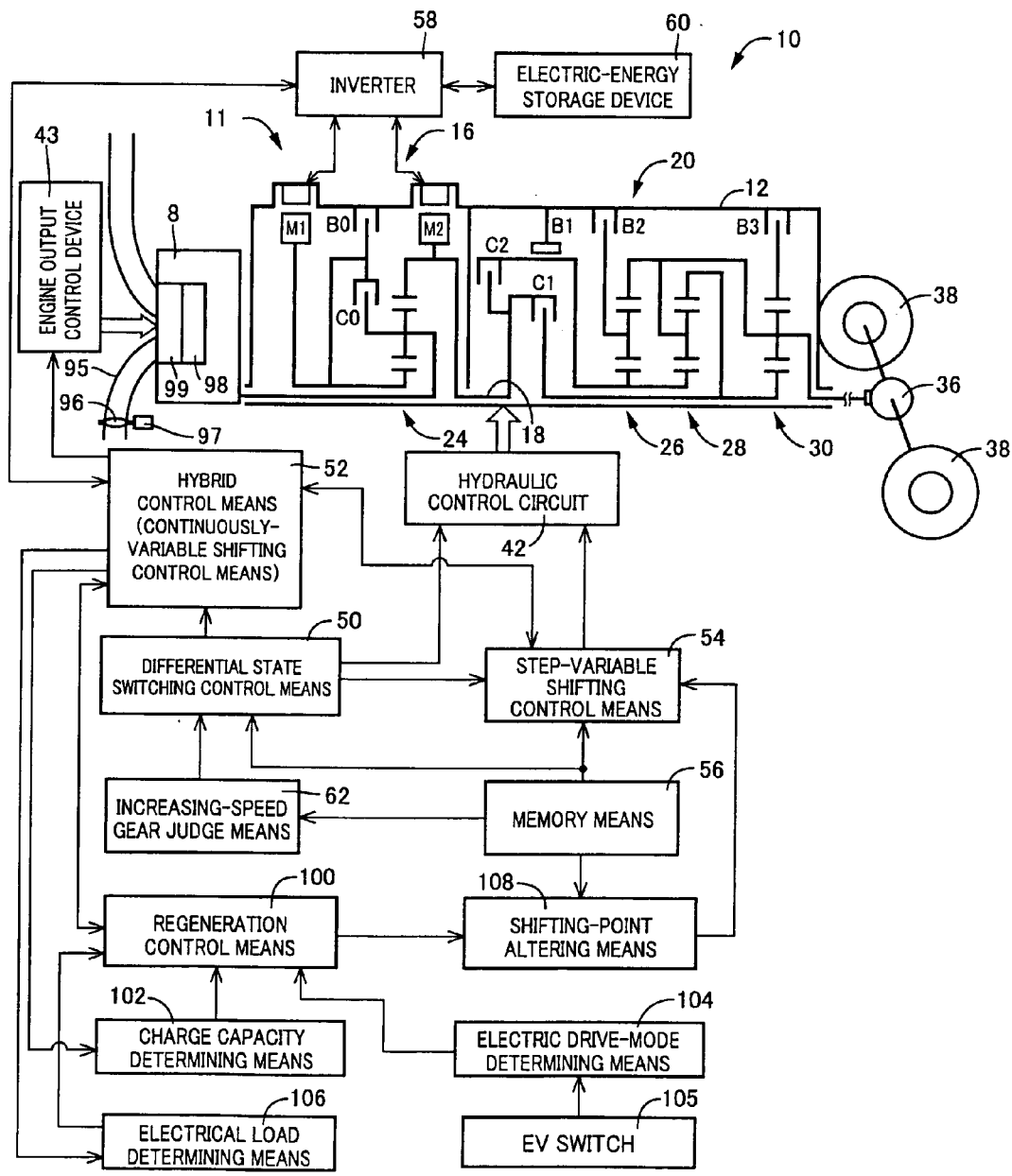
FIG. 6 is a functional block diagram illustrating a major control function to be executed by the electronic control device related to a first embodiment shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles. Here, the engine 8 in the present embodiment corresponds to a claimed drive-force source, the shifting mechanism corresponds to a claimed power transmitting apparatus for vehicle, and the differential portion 11 corresponds to a claimed electrically controlled differential portion.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 can be said to be an electrically controlled differential portion in respect of an operation in which a differential state is altered using a first electric motor. The differential portion 11 includes a first electric motor M1, a power distributing mechanism 16 serving as a mechanical mechanism like a differential mechanism through which an output of the engine 8, inputted to the input shaft 14, is transferred to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

Here, the first electric motor M1 of the present embodiment corresponds to a claimed control electric motor, and the second electric motor M2 corresponds to a claimed electric motor. Since the power transmitting member 18 functions as an input side (input shaft) of the automatic transmission 20, the second electric motor M2 can be said to be connected to the input side (input shaft) of the automatic transmission 20.

The power distributing mechanism 16, corresponding to the differential mechanism of the present invention, mainly includes a differential-portion planetary gear unit 24 of a single pinion type having a given gear ratio $\rho 0$ of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio $\rho 0$ is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio $\gamma 0$ (rotation speed $N_{IN}$ of the driving device input shaft 14/rotation speed $N_{18}$ of the power transmitting member 18) continuously varying in a value ranging from a minimum value $\gamma 0min$ to a maximum value $\gamma 0max$. In other words, controlling the operating state of the first electric motor M1 leads to control of the differential state between the rotation speed of the input shaft 14 and the power transmitting member 18 functioning as the output shaft. The rotation speed $N_{18}$ of the power transmitting member 18 is detected by a resolver 19 disposed in the vicinity of the second electric motor M2. The power transmitting member 18 of the present embodiment functions as a claimed output shaft of the differential mechanism and a claimed input side of the shifting portion.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, that is, in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio $\gamma 0$ connected to a value of "1".

Next, instead of the switching clutch C0, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state. Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio $\gamma 0$ connected to a value smaller than "1", i.e., for example, about 0.7.

With the present embodiment, the switching clutch C0 and the switching brake B0 selectively place the shifting state of differential portion 11 (power distributing mechanism 16) in the differential state i.e. the unlocked state, and the non-differential state i.e. the locked state. That is, the switching clutch C0 and the switching brake B0 serves as a differential state switching device that selectively switches the differential portion 11 (power distributing mechanism 16) in one of the continuously variable shifting state and the fixed shifting state.

The continuously variable shifting state is operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable. In the fixed shifting state, the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 forming a port of the power transmitting path extending from the engine 8 to the drive wheel 38, includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R0 meshing with the first sun gear S1 via the first planetary gears P1, having a gear ratio $\rho 1$ of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having for example a gear ratio $\rho 2$ of about "0.425".

The third planetary gear unit 30 includes a third sun gear S3, third planetary gears P3, a third carrier CA4 supporting the third planetary gears P3 to be rotatable about its axis and about the axis of the third sun gear S3, and the third ring gear R3 meshing with the third sun gear S3 through the third planetary gears P3, having a gear ratio $\rho 3$ of about "0.421". With the first sun gear S1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios $\rho 1$, $\rho 2$ and $\rho 3$ are represented by ZS1/ZR1, ZS2/ZR2, and ZS3/ZR3, respectively. The automatic transmission 20 in the present embodiment corresponds to a claimed shifting portion.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first differential-portion ring gear R0, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation Table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state.

In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state. Here, the output shaft rotation speed $N_{OUT}$ is detected by a rotation speed detecting sensor 23 provided on the output shaft 22. This rotation speed detecting sensor 23 can detect, in addition to the output shaft rotation speed $N_{OUT}$ of the output shaft 22, a rotation direction of the output shaft 22 as well which allows an advancing direction of the vehicle upon the neutral state to be detected.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position. Engaging the switching clutch C0, the first clutch C1 and the first brake B1 results in the 3rd-speed gear position with the speed ratio γ3 of, for instance, about "1.424", which is lower than that of the 2nd-speed gear position.

Engaging the switching clutch C0, the first clutch C1 and the second clutch C2 results in the 4th-speed gear position with the speed ratio γ4 of, for instance, about "1.000", which is lower than that of the 3rd-speed gear position. With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches and the brakes C0, C1, C2, B0, B1, B2 and B3 are disengaged.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in a continuously variable shifting ratio. Accordingly, a speed ratio can be continuously variable across the adjacent gear positions, making it possible for the shifting mechanism 10 as a whole to obtain a continuously variable total speed ratio (overall speed ratio) $\gamma T$.

Figure 3:
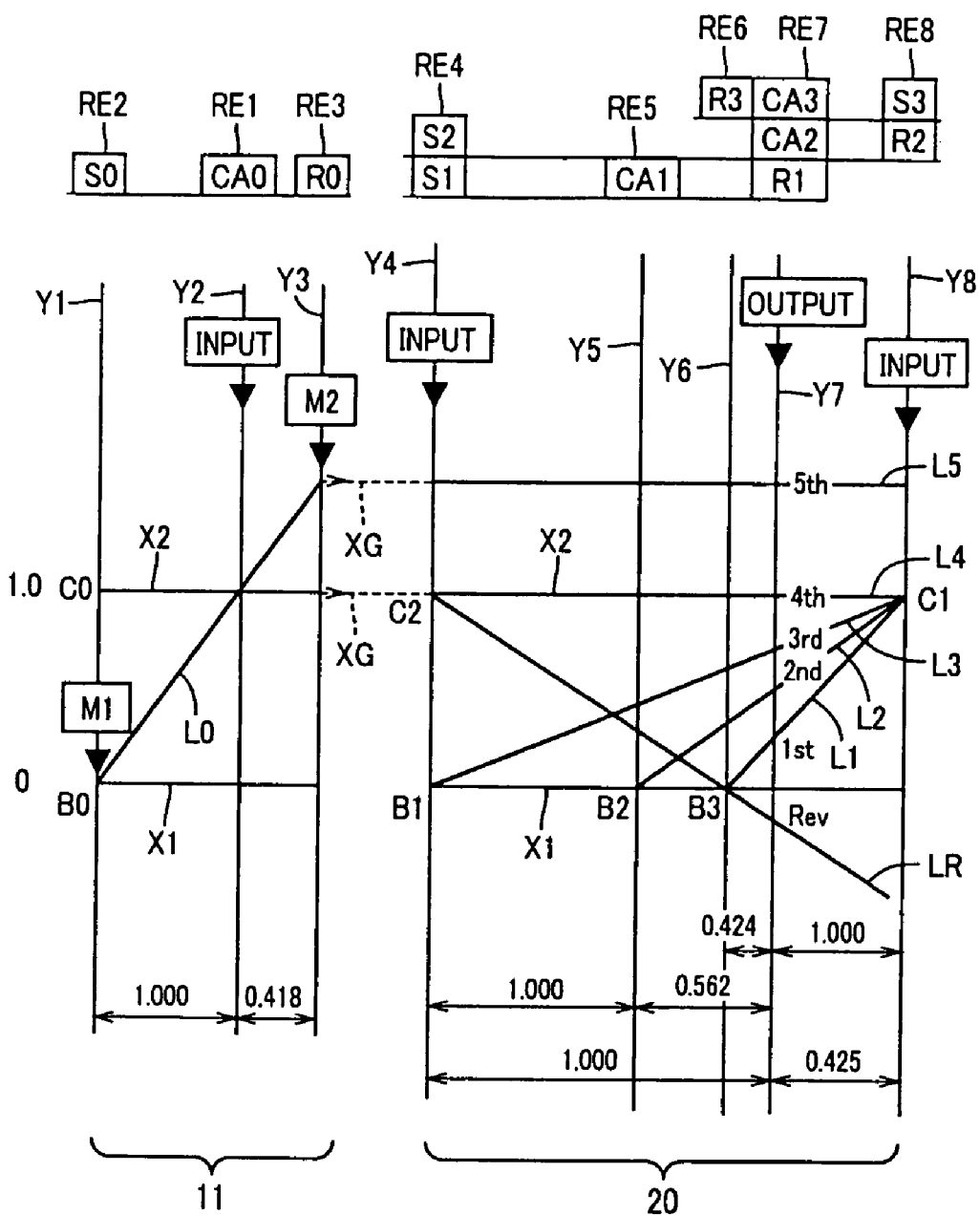
FIG. 3 is a collinear chart illustrating the relative rotation speed of rotary elements in each of different gear positions when the hybrid vehicle drive apparatus, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios $\rho$ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio $\rho 0$ of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier corresponding to a fifth rotary element (fifth element) RE5, the third ring gear R3 corresponding to a sixth rotary element (sixth element) RE6, the first differential-portion ring gear R0 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios $\rho 1$, $\rho 2$ and $\rho 3$ of the first to third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio $\rho$ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "$\rho$". For each of the first to third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio $\rho$.

Expressing the structure using the collinear chart shown in FIG. 3, the shifting mechanism 10 of the present embodiment takes the form of a structure including the power distributing mechanism 16 (continuously variable shifting portion 11). With the power distributing mechanism 16, the differential-portion planetary gear unit 24 has the first rotary element RE1 (differential-portion carrier CA0) connected to the input shaft 14 i.e. the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$.

In contrast, with the switching brake B0 being engaged to halt the rotation of the differential-portion sun gear S0, the power distributing mechanism 16 is brought into the non-differential state to function as the speed increasing mechanism. Thus, the straight line L0 describes a state as shown in FIG. 3, under which the rotation of the differential-portion ring gear R0 i.e. the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
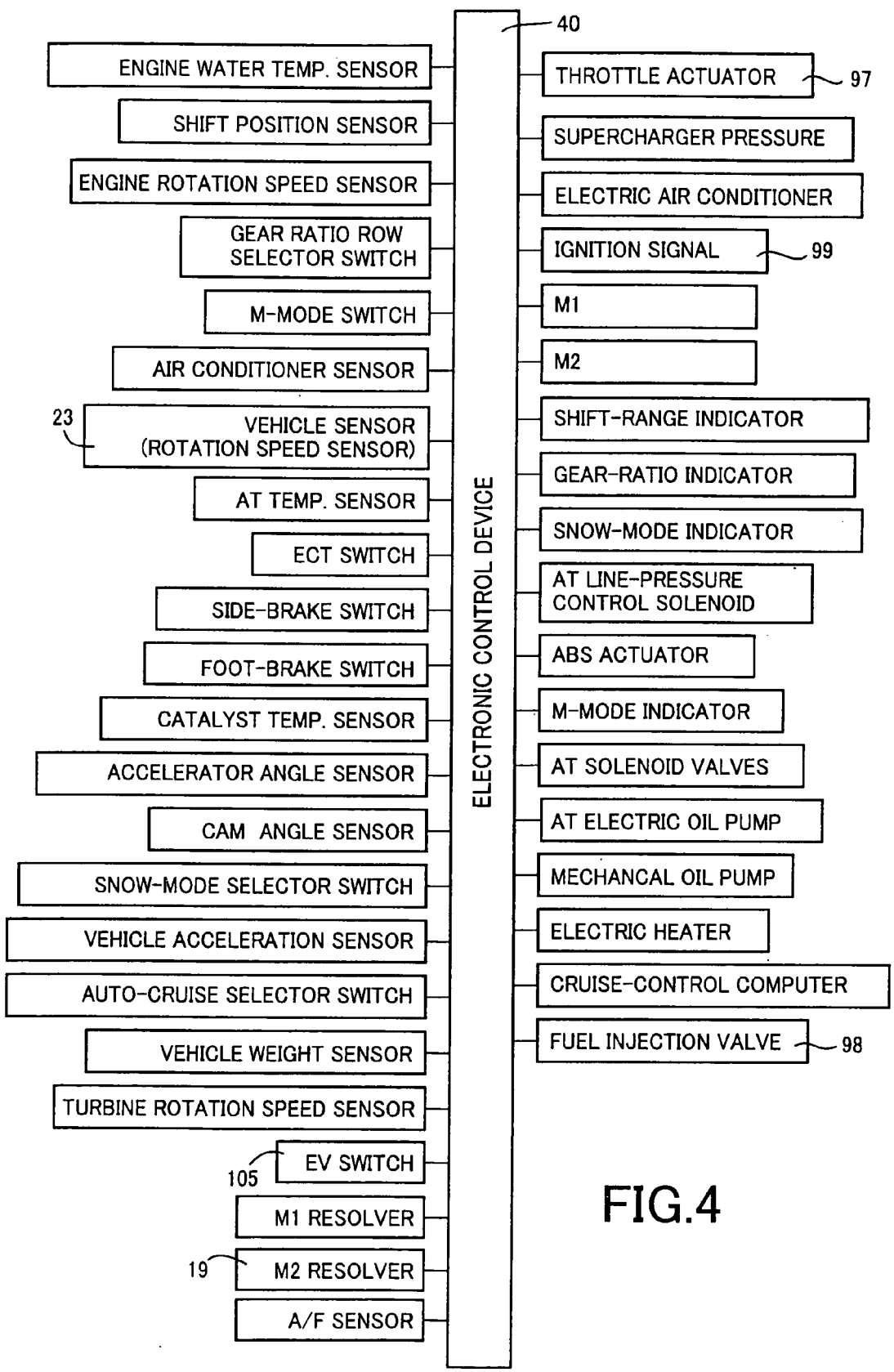
FIG. 4 is a view illustrating input and output signals to be input to or output from an electronic control device incorporated in the hybrid vehicle drive apparatus shown in FIG. 1.

FIG. 4 exemplarily shows various input signals applied to an electronic control device 40, serving as a control device for controlling the shifting mechanism 10 forming part of the hybrid vehicle drive apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the ROM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position $P_{SH}$, a signal indicative of a rotation speed $N_{M1}$ (hereinafter, referred to as a "first-motor rotation speed $N_{M1}$") of the first electric motor M1, a signal indicative of a rotation speed $N_{M2}$ (hereinafter, referred to as a "second-motor rotation speed $N_{M2}$") of the second electric motor M2, a signal indicative of the engine rotation speed $N_E$ representing the rotation speed of the engine 8, a signal indicative of a set value of gear ratio row, a signal commanding an "M" mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output shaft 22, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating a hydraulic pressure pump serving as a hydraulic pressure source of the hydraulically operated control circuit 42, a signal for driving an electric heater, and signals applied to a cruise-control computer, etc.

Figure 5:
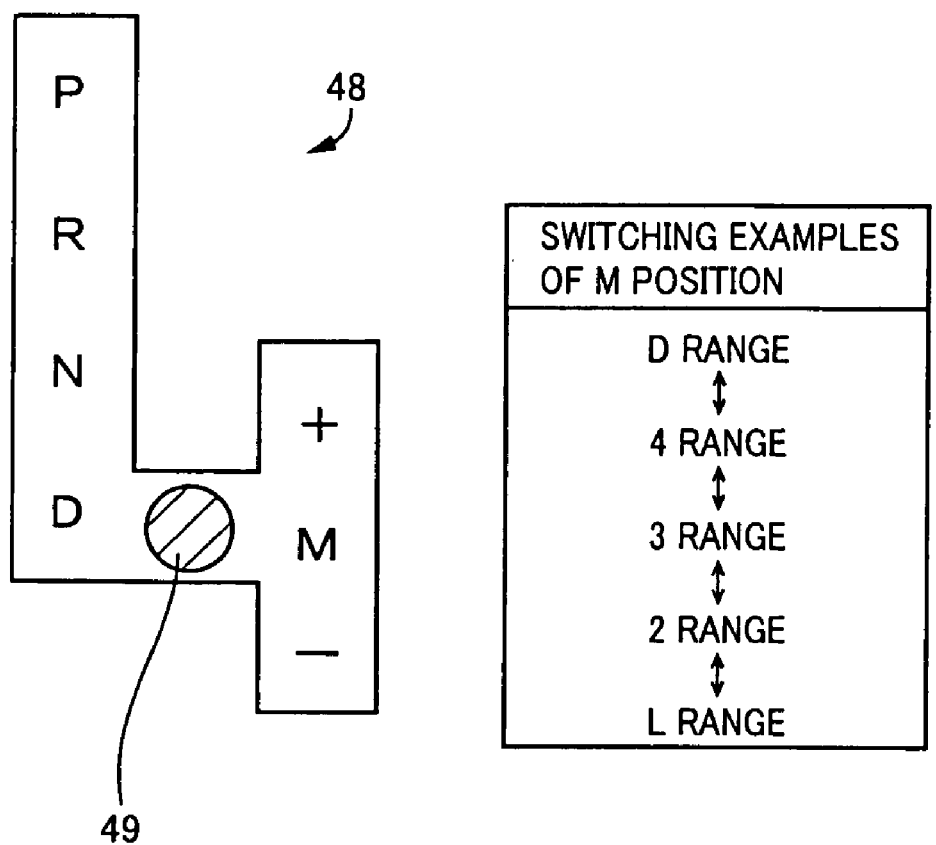
FIG. 5 is a view showing one sample of a shift operating device which is operated by a driver and is provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff i.e. interrupted state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state i.e. interrupted.

The "M" position is located at the same position as the "D" position in the longitudinal direction of the vehicle, and is adjacent thereto in the lateral direction of the same. The shift lever 49 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the shift lever 48 to the shift-up position "+" or the shift-down position "−", any one of "D" to "L" positions is selected.

Five shifting ranges including the "D" through "L" positions selected at the "M" position have respective different lowest values of the overall speed ratio γT which corresponds to the highest output speed of the shifting mechanism 10. Namely, the five "D" through "L" positions select respective different numbers of the speed positions (gear positions) of the automatic transmission 20 automatically selectable, so that the highest vehicle speed available is determined by the selected number of the gear positions. The shift lever 49 is biased by biasing means such as a spring to be automatically returned from the shift-up position "+" and shift-down position "−" back to the manual forward-drive position M. The shift device 48 is provided with a shift-position sensor (not shown) operable to detect the presently selected position of the shift lever 49, so that signals indicative of the presently selected operating position of the shift lever 48 and the number of shifting operations thereof in the "M" position, are outputted to the electronic control device 40.

When the "M" position is selected by manipulation of the shift lever 49, the automatic shifting is executed within the range of total shifting ratio γT which can be shifted by each shifting range of the shifting mechanism 10 so as not to executed the maximum speed side shifting position or shifting ratio. For example, upon the step variable shifting drive mode in which the shifting mechanism 10 is switched to the step variable shifting state, the automatic shifting is executed within the range of total shifting ratio γT which can be shifted by each shifting range of the shifting mechanism 10. Alternately, upon the continuously variable shifting drive mode, the automatic shifting is executed within the range of total shifting ratio γT which can be shifted by each shifting range of the shifting mechanism 10. Here, the shifting range is obtained by a continuously variable shifting ratio width and each of gear positions corresponding to each of the shifting ranges in which the automatic transmission 20 is automatically shifted within the shiftable shifting position. This "M" position corresponds to a shift position for selecting a manually shifting drive mode (manual mode) which is a control mode for executing a manual shifting control of the shifting mechanism 10.

Figure 7:
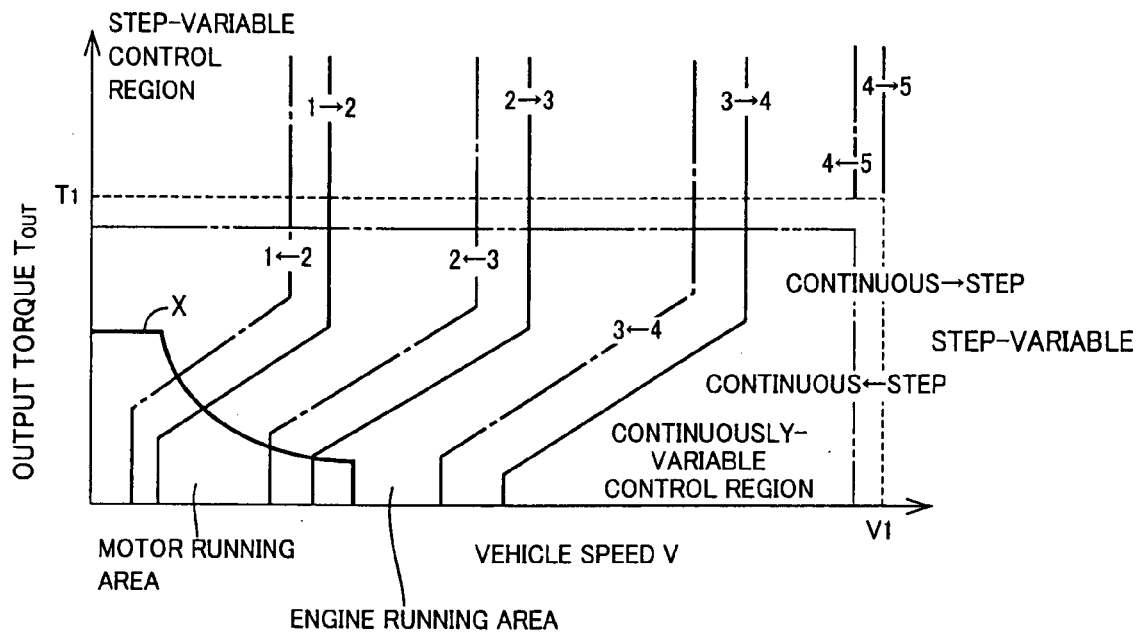
FIG. 7 is a view representing one example of a preliminarily stored shifting diagram, plotted on a two-dimensional coordinate in terms of parameters including a vehicle speed and output torque, based on which the operation is executed whether to a shifting is executed in an automatic shifting portion; one example of preliminarily stored diagram, based on which a shifting state of the shifting mechanism is switched; and one example of a preliminarily stored drive-force source switching diagram having a boundary line between an engine drive region and a motor drive region based on which an engine drive mode and a motor drive mode is switched.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7.

That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the continuously variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission.

For instance, during the vehicle running at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationship) of the engine 8 preliminarily determined on an experimental basis such that, during the vehicle running under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio γT of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the speed ratio γ0 of the differential portion 11, while controlling the total speed ratio γT within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line X, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line X) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$ i.e. low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed $N_{M1}$ at a negative rotation speed, i.e., at an idling speed to maintain the engine rotation speed $N_E$ at a zeroed or nearly zeroed level, thereby minimizing a drag of the engine 8 remained under a halted state for providing improved fuel economy.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a charge capacity SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level, regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable a continuously variable shifting operation to be executed.

Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56. In this case, the step-variable shifting control means 54 performs the automatic shifting upon executing the operation excepting the operations to engage the switching clutch C0 and the switching brake B0 in the engagement operation table shown in FIG. 2.

This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in continuously variable speed ratio ranges. Accordingly, since the speed ratio is continuously variable across the adjacent gear positions, the shifting mechanism 10 as a whole can obtain the overall speed ratio γT in a continuously variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V including the determining vehicle speed V1 and determining output torque T1, and output torque $T_{OUT}$, based on which the switching control means 50 determines a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for comparing a current vehicle speed V and a determining vehicle speed V1, and another determining formula or the like for comparing output torque $T_{OUT}$ and determining output torque T1. In this casing, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the vehicle running to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the vehicle running at the high speed turns out a consequence of deterioration in fuel economy. The determining vehicle speed V1 is determined to a value that can render the shifting mechanism 10 operative in the step-variable shifting state during the vehicle running at the high speed so as to address such an issue. Further, determining torque T1 is determined to a value that prevents reactive torque of the first electric motor M1 from covering a high output region of the engine during the vehicle running at a high output. That is, determining torque T1 is determined to such a value depending on, for instance, a characteristic of the first electric motor M1 that is possibly mounted with a reduced maximum output in electric energy for miniaturizing the first electric motor M1.

Figure 8:
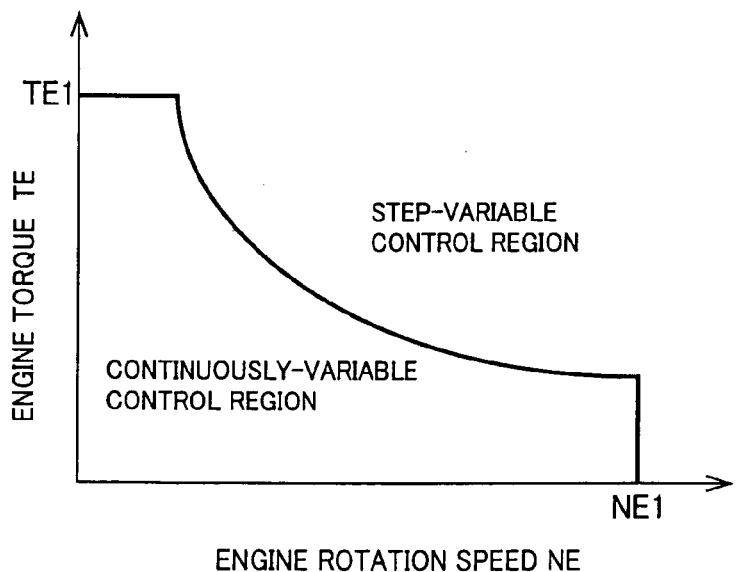
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. That is, the switching control means 50 may determine whether the vehicle condition, represented with the engine rotation speed $N_E$ and engine torque $T_E$, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 8, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 8, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the vehicle running at a low/medium speed and low/medium output, the shifting mechanism 10 is placed in the continuously variable shifting state to ensure the vehicle to have improved fuel economy performance. During the vehicle running at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a conversion loss between the drive force and electric energy, generated when the shifting mechanism 10 is caused to act as the electrically controlled continuously variable transmission, providing improved fuel consumption.

During the vehicle running on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

According to another viewpoint, further, during the vehicle running on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode.

Further, during the vehicle running under a decelerated condition (during a coast running state) with an accelerator pedal being released or under a braking state with a foot brake being depressed, regeneration control means 100 allows kinetic energy of the vehicle, i.e., a reverse drive-force transferred from the drive wheels 38 to the engine 8, to drivably rotate the second electric motor M2 for improvement in fuel consumption. Thus, the second electric motor M2 is rendered operative to act as an electric power generator to generate electric energy. Resulting electric energy, i.e. a second-motor-generated electric current is supplied through an inverter 58 to a battery 60 for charging the same. Such a regeneration control is performed so as to achieve a regeneration amount that is determined based on a charge capacity SOC and a braking-force distribution ratio of a braking force exerted by a hydraulic brake for obtaining the braking force depending on an accelerator-pedal depressing stroke.

Meanwhile, with the battery 60 having the charge capacity SOC lower than a given value that is a predetermined lower limit charge capacity, it is desired to increase the regenerating rate for the coast running state with a view to immediately recovering the charge capacity SOC to a proper charge capacity. During such an operation, the regeneration control means 100 executes a control for increasing the regeneration amount of the second electric motor M2 based on shifting-point altering means 108, which will be described below in detail.

Hereunder, description is made of the control for increasing the regeneration amount to be achieved with the regeneration control means 100. The regeneration control means 100 increases the regeneration amount based on various determining results of charge capacity determining means 102, electric drive-mode determining means 104 and electrical load determining means 106.

The charge capacity determining means 102 makes a query as to whether the charge capacity SOC of the battery 60 is less than a given value A. The given value A, preliminarily determined on experimental tests or theoretically determined, is determined to lie at a lower limit value of a charge capacity range regarded to be appropriate for the battery 60. That is, the given value A is determined to lie at a value such that if the charge capacity SOC becomes less than the given value A, then the battery 60 needs to be rapidly charged. If the charge capacity determining means 102 makes a positive answer, i.e. if the charge capacity SOC becomes less than the given value A, the second electric motor M2 is operated with priority for the charging and/or the electric power generation during the regeneration mode. This allows the controls to be executed with priority for increases in the regeneration amount (electric power generation amount) of the regeneration control means 100 and/or the charging amount of the battery 60.

The electric drive-mode determining means 104 makes a query as to whether a driver depresses an EV switch 105 to allow the vehicle to run under a motor-drive state (electric drive state). If the EV switch 105 is depressed, the second electric motor M2 is rendered operative to provide drive torque for the vehicle to run under the motor drive mode except for a case in which, for instance, the vehicle runs at a vehicle speed beyond a given vehicle speed. Under such an electric drive state, power consumption of the second electric motor M2 increases. The charging and/or the electric power generation using the second electric motor M2 are performed with priority during a regenerating state. This allows the controls to be executed with priority for increases in the regeneration amount (electric power generation amount) of the regeneration control means 100 and/or the charging amount of the battery 60.

The electrical load determining means 106 makes a query as to whether a current electrical load of the vehicle remains in an increasing state. In particular, a query is made as to whether a discharging current of the battery 60, resulting from, for instance, an air-conditioner being actuated, exceeds a given value. Further, the given value of the discharging current is preliminarily determined on experimental tests to a value at which a remarkable drop occurs in the charge capacity SOC of the battery 60. Thus, if the charge capacity SOC of the battery 60 exceeds the given value, the electrical load of the vehicle increases. In such a case, the charging and/or the electric power generation using the second electric motor M2 are performed with priority during the regenerating state. This allows the controls to be executed with priority for increases in the regeneration amount (electric power generation amount) of the regeneration control means 100 and/or the charging amount of the battery 60.

If the answer of any one of the charge capacity determining means 102, the electric drive-mode determining means 104 and the electrical load determining means 106 is YES, the regeneration control means 100 executes the control with priority for increasing the regeneration amount (electric power generation amount) of the second electric motor M2 during the regenerating mode. In particular, the regeneration control means 100 increases the regeneration amount (electric power generation amount) of the second electric motor M2 by increasing the rotation speed $N_{M2}$ of the second electric motor M2.

During the regenerating state, the second electric motor M2 is drivably rotated with the reverse drive-force transmitted from the drive wheels 38 to generate electric power. The second electric motor M2 is connected to the power transmitting member 18 that serves as the rotary member of the automatic shifting portion 20 at an input thereof. Therefore, if the rotation speed of the power transmitting member 18 increases, then the rotation speed $N_{M2}$ of the second electric motor M2 is concurrently increased. This increases regeneration amount of the second electric motor M2.

The determination is made for the second electric motor M2 to be operated with priority for the charging and/or the electric power generation. This determination is made based on various determination results of the electric drive-mode determining means 104 and the electrical load determining means 106. Upon receipt of such determination, the shifting-point altering means 108, forming an essential part of the present invention, allows the downshift point for the vehicle running under the decelerated condition (during the coast running state), effectuated in the automatic shifting portion 20, to be altered to a point on a higher vehicle speed than that at which the downshift point for the running-performance-conscious mode (normal mode) is executed. With such an alteration, the downshift is initiated in the automatic shifting portion 20 in a high vehicle-speed region during the coast running state. That is, the downshift is initiated on an earlier stage than that at which the downshift is normally effectuated during the coast running state.

With the initiation of such a downshift, the automatic shifting portion 20 has an increasing speed ratio, with an accompanying increase in the rotation speed of the power transmitting member 18, i.e. the rotation speed $N_{M2}$ of the second electric motor M2. This increases a charging amount or a charging efficiency of the battery 60 and/or the regeneration amount (electric power generation amount) or electric power generating efficiency of the second electric motor M2.

Figure 11:
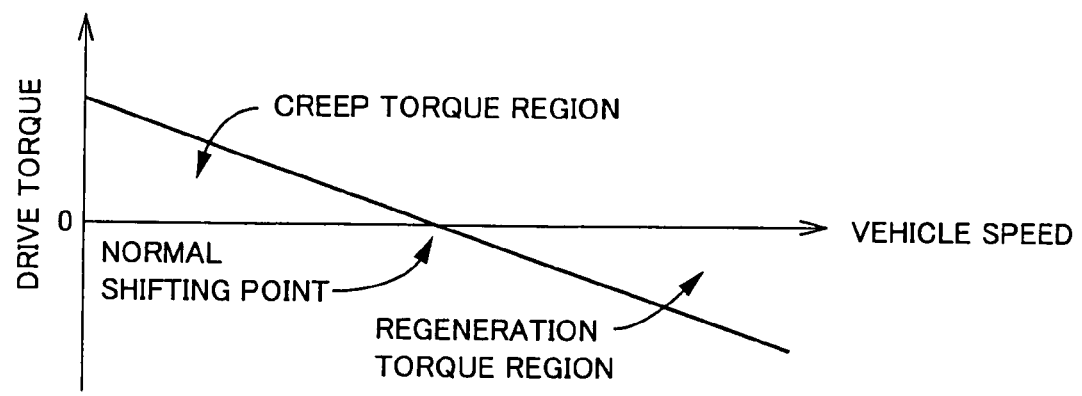
FIG. 11 is a conceptual view showing the relationship between a vehicle speed and a drive force of the vehicle.

Further, the downshift point for the running-performance-conscious mode corresponds to a normal shifting point indicated in FIG. 11. As shown in FIG. 11, the normal shifting point is set to a value in close proximity to a boundary point between a regenerating torque region in which the second electric motor M2 provides regeneration torque to generate a drive force in negative direction, and a creep torque region in which creep torque is electrically generated to provide the drive force in a positive direction. With the downshift point set to such a region with the drive force being nearly zeroed, the occurrence of shifting shock or regeneration torque escape resulting from the drive force acting on the vehicle during the downshift can be avoided. If no second electric motor M2 is operated with priority for performing the charging and/or the electric power generation, the shifting-point altering means 108 allows the shifting point to be reset to the normal shifting point, thereby causing the shifting to be executed with a conscious attention on drivability.

Figure 9:
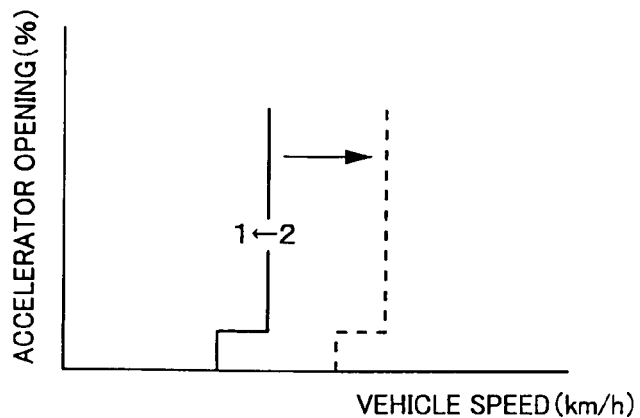
FIG. 9 is a view showing a shifting point on which a coast-down shifting is effectuated from a 2nd-speed gear position to a 1st-speed gear position.

Meanwhile, if the second electric motor M2 is operated with priority for performing the charging and/or the electric power generation, the shifting-point altering means 108 sets the shifting point to the shifting point on the higher vehicle speed than that at which the shifting point for the running-performance-conscious mode is set. FIG. 9 shows how the shifting point for the coast-down shifting to be achieved from the 2nd-speed gear position to the 1st-speed gear position is altered. Here, a solid line indicates one shifting point used for the running-performance-conscious mode (normal state), and a broken line indicates the other shifting point used for the second electric motor M2 to be operated with priority for the charging and/or the electric power generation.

As shown in FIG. 9, for the second electric motor M2 to be operated with priority for the charging and/or the electric power generation, the downshift point is set to a point on the higher vehicle speed than that at which the downshift point is determined for the normal mode. With such alteration, if the second electric motor M2 is operated with priority for the charging and/or the electric power generation, the downshift is immediately executed in the high vehicle speed region, thereby increasing the rotation speed of the power transmitting member 18 in accordance with the speed ratio of the automatic shifting portion 20. With such an increase in rotation speed, the rotation speed $N_{M2}$ of the second electric motor M2 increases, increasing the regeneration amount (electric power generation amount) of the second electric motor M2.

Figure 10:
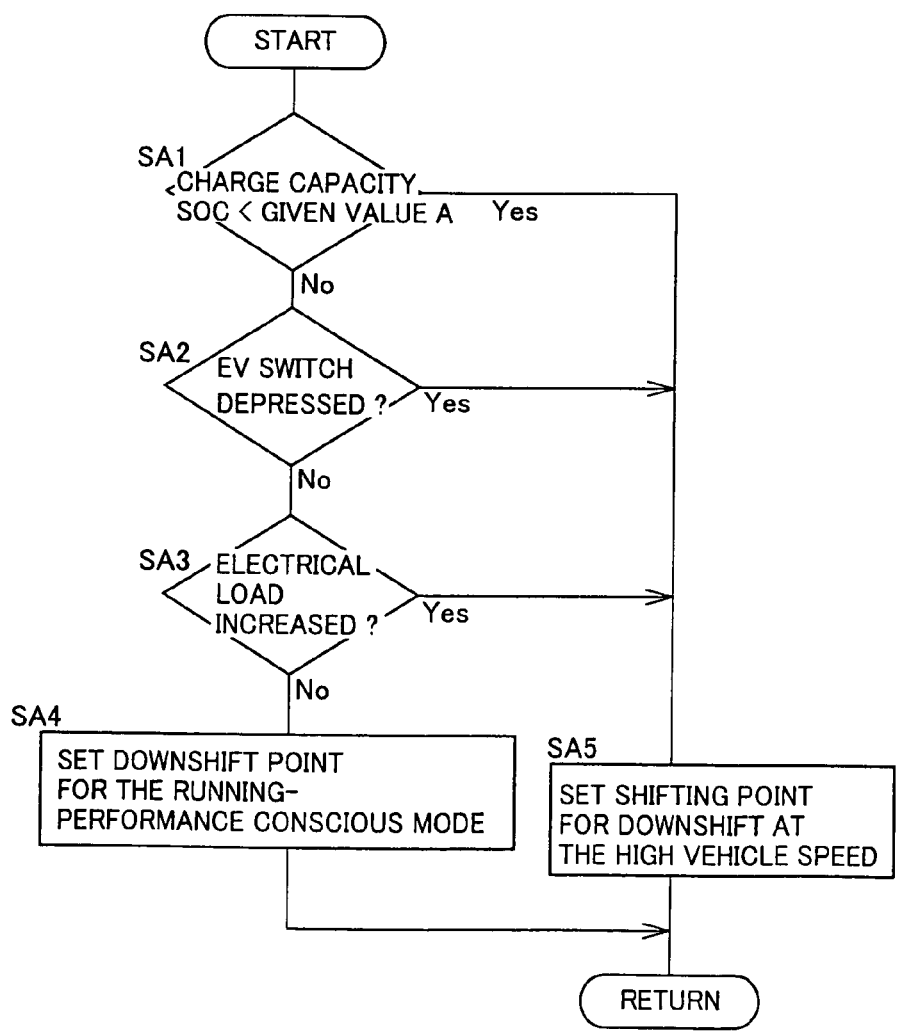
FIG. 10 is a flow chart illustrating a major part of control operations to be executed with an electronic control device, i.e. a regeneration control to be executed for increasing a regeneration amount depending on a vehicle condition.

FIG. 10 is a flow chart illustrating a basic sequence of major control operations to be executed with the electronic control device 40, that is, a basic sequence of control operations to be executed for increasing the regeneration amount depending on a state of a vehicle. This basic sequence is repeatedly executed on an extremely short cycle in the order of, or instance, several milliseconds to several tens milliseconds.

First, at SA1 corresponding to the charge capacity determining means 102, a query is made as to whether the charge capacity SOC of the battery 60 is less than the given value A. If the answer to SA1 is NO, then another query is made at SA2, corresponding to the electrical drive mode determining means 104, as to whether a driver depresses or turns on the EV switch 105. If the answer to SA2 is NO, then a query is made at SA3, corresponding to the electrical load determining means 106, as to whether there is an increasing electrical load including an auxiliary-unit load such as, for instance, an air conditioner. If the answer to SA3 is NO, then the operation is executed at SA4, corresponding to the shifting-point altering means 108, so as to allow the downshift point to be altered to the shifting point for the running-performance conscious mode.

Further, if the answer to any one of SA1, SA2 and SA3 is YES, i.e. if the second electric motor M2 has priority to perform the charging and/or the electric power generation, then at SA5 corresponding to the shifting-point altering means 108, the downshift point for the running-performance-conscious mode with priority for obtaining running performance is set to the shifting point for the downshift to be initiated at the high vehicle speed. Thus, the downshift is executed in the high vehicle speed region. This causes the rotation speed of the power transmitting member 18, corresponding to the rotary element of the automatic shifting portion 20 at the input side thereof, to increase to be higher than that achieved during the normal mode. In addition, the rotation speed $N_{M2}$ of the second electric motor M2 increases, thereby increasing the regeneration amount (electric power generation amount) of the second electric motor M2.

As set forth above, with the present embodiment, the shifting-point altering means 108 is provided to be operative for the second electric motor M2 to be operated with priority for performing the charging and/or the electric power generation. That is, the shifting-point altering means 108 alters the shifting point for the vehicle to run under the decelerated condition (during the coast running mode) to the point on the higher vehicle speed than that at which the downshift point for the running-performance-conscious mode is set. Therefore, if the second electric motor M2 is operated with priority to perform the charging and/or the electric power generation, the downshift is initiated at the higher vehicle speed than that at which the downshift is initiated for the running-performance-conscious mode.

With such an operation, the rotation speed of the power transmitting member 18, corresponding to the input of the automatic shifting portion 20, increases on an earlier stage than that at which the rotation speed of the power transmitting member 18 increases during the normal mode. This increases the rotation speed $N_{M2}$ of the second electric motor M2 connected to the power transmitting member 18. This causes an increase in the charging amount of the charge capacity of the battery 60 and/or the regeneration amount or electric power generation efficiency of the second electric motor M2.

Further, if the second electric motor M2 is not operated with priority to perform the charging and/or the electric power generation, the downshift for the running-performance-conscious mode is initiated, thereby preventing the occurrence of shifting shock or regeneration torque escape during the shifting mode. Thus, causing the shifting-point altering means 108 to properly alter the shifting point results in achieving a balance between the increase in the regenerating rate of the second electric motor M2 and the driveability of the vehicle.

With the present embodiment, as used herein, "a case wherein the second electric motor M2 is operated with priority for the charging and/or the electric power generation" refers to a phase in which the charge capacity SOC is less than the given value A. Therefore, if the charge capacity SOC is less than the given value A, then the shifting point is altered to another shifting point on the high vehicle speed, thereby increasing the regeneration amount. This enables a drop in charge capacity SOC to be rapidly recovered.

With the present embodiment, moreover, "a case in which the second electric motor M2 is operated with priority for the charging and/or the electric power generation" refers to a phase in which the vehicle runs in an electrically controlled running drive. Therefore, increasing the regeneration amount can address an issue of the increase in electric power consumption caused by the electrically controlled running drive.

With the present embodiment, further, "a case in which the second electric motor M2 is operated with priority for the charging and/or the electric power generation" refers to a phase in which the vehicle has an increasing electrical load. Therefore, increasing the regeneration amount can address an issue of the increase in the electrical load.

With the present embodiment, furthermore, the shifting point represents the downshift point established in the automatic shifting portion 20. Therefore, executing the downshift in the automatic shifting potion 20 during the regeneration mode increases the rotation speed of the power transmitting member 18 corresponding to the input of the automatic shifting portion 20. With a progress of such an increase, the rotation speed $N_{M2}$ of the second electric motor M2 connected to the power transmitting member 18 increases, resulting in an increase in the regeneration amount.

With the present embodiment, the differential portion 11 is connected between the engine 8 and the automatic shifting portion 20. Controlling the operating state of the first electric motor M1 allows the differential portion 11 to control the differential state between the rotation speed of the input shaft 14 and the rotation speed of the power transmitting member 18 functioning as the output shaft. Thanks to the power transmitting member 18 functioning as the input of the automatic shifting portion 20, initiating the downshift in the automatic shifting portion 20 increases the rotation peed of the power transmitting member 18 serving as the input of the automatic shifting portion 20 and the output of the differential portion 11. This can increase the rotation speed $N_{M2}$ of the second electric motor M2, increasing the regeneration amount. In addition, controlling the operating state of the first electric motor M1 enables the rotation speed of each rotary element of the differential portion 11 to be properly controlled.

With the present embodiment, moreover, the automatic shifting portion 20 is comprised of the step-variable shifting portion. Thus, as the vehicle state comes to the downshift point, the automatic shifting is executed in the automatic shifting portion 20, thereby providing an increasing speed ratio. With a progress of such an increase, the rotation speed of the power transmitting member 18 serving as the input of the automatic shifting portion 20, increases thereby increasing the regeneration amount of the second electric motor M2.

With the present embodiment, besides, controlling the operating state of the first electric motor M1 allows the differential portion 11 to be operative as a continuously variable transmission, enabling drive torque to be smoothly varied. In addition, the differential portion 11 is operative not only to act as an electrically controlled continuously variable transmission with a continuously varying speed ratio but also to act as a step-variable transmission with step-by-step variation in speed ratio causing the shifting mechanism 10 to vary the speed ratio step-by-step to immediately obtain drive torque.

Although the present invention has been described above in detail with reference to the embodiment shown in the drawings, the present invention may be applied in other modes.

The above-illustrated embodiment is set with reference to an exemplary case wherein the coast-down shifting is effectuated from, for instance, the 2nd-speed gear position to the 1st-speed gear position. However, the present invention is construed not to be limited to the regeneration control executed for the coast-down shifting from the 2nd-speed gear position to the 1st-speed gear position but to be applied to a structure in which the coast-down shifting is initiated between the other gear positions such as, for instance, a 3rd-speed gear position and the 2nd-speed gear position, with accompanying similar advantageous effects.

In the above-illustrated embodiment, if the answer of any one of the charge capacity determining means 102, the electrical drive mode determining means 104 and the electrical load determining means 104 is YES, the control is executed to increase the regeneration amount. However, all of such parameter determining means have not necessarily need to be determined, and for instance only the charge capacity determining means 102 may be operated to make a determination.

In the above-illustrated embodiment, the shifting mechanism 10 takes the form of a structure including the differential portion 11 and the automatic shifting portion 20. However, no need necessarily arises for the differential portion 11 to be provided and the present invention can be implemented provided that the shifting mechanism 10 has a structure in which an electric motor is connected to the input of the shifting portion. In addition, a torque converter or a clutch may be interposed between the electric motor and the shifting portion.

In the above-illustrated embodiment, while the differential portion 11 is configured to function as the electrically controlled continuously variable transmission in which the speed ratio γ0 continuously varies from the minimal value γ0min to the maximal value γ0max, the present invention may be applied even to a case wherein the speed ratio γ0 of the differential portion 11 does not continuously vary but pretended to vary stepwise using the differential action.

With the power distribution mechanisms 16 of the above-illustrated embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

While the above-illustrated embodiment is described with reference to the engine 8 directly connected to the input shaft 14, these component parts may suffice to be operatively connected via, for instance, gears, belts or the like. No need may arise for the engine 8 and the input shaft 14 to be coaxially disposed.

Further, while the above-illustrated embodiment is described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the above-illustrated embodiment, the hydraulically operated frictional coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 42 may not include a valve device for switching hydraulic passages and may be replaced with a switching device or electromagnetically operated switching device or the like that are operative to switch electrical command signal circuits for electromagnetic clutches.

In the above-illustrated embodiment, while the automatic transmission portion 20 is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmissive state via a set of transmitting members structured of, for instance, a counter-gear pair acting as the power transmitting member 18, a sprocket and a chain.

Further, the power distributing mechanism 16 of the above-illustrated embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

In the above-illustrated embodiment, while the engine 8 and the differential portion 11 are directly connected with each other, such connecting mode is not essential. The engine 8 and the differential portion 11 can be connected via the clutch etc.

In the above-illustrated embodiment, the differential portion 11 and the automatic shifting portion 20 are connected to each other in series in the structure. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action.

Disposing positions and disposing order of the differential portion 11 and the automatic shifting portion 20 are not limited to the above-illustrated mode, but can be freely altered. As long as the shifting mechanism 10 has the functions for executing the electrically operated differential action and the shifting, the present invention can be applied to even a case wherein structure for realizing the both functions are partially overlapped or wholly common.

Noted that explained in the above are no more than illustration of the present invention. The present invention can be carried out in other various modes based on knowledge of the skilled person in this technical field.

What is claimed is:

1. A control device for a vehicular power transmitting device, wherein:
   the vehicular power transmitting device comprises a shifting portion forming part of a power transmitting path between a drive-force source and drive wheels, an electric motor connected to the shifting portion at an input side thereof, and regeneration control means operative to cause the electric motor to generate electric power during a vehicle running under a decelerating state;
   the control device includes shifting-point altering means operative to alter, when the electric motor is operated with priority for a charging and/or electric power generation, a shifting point for the vehicle running under a decelerating state to a point on a higher vehicle speed than that at which a shifting point for a running-performance conscious state is set;
   the regeneration control means increases regeneration amount of the electric motor based on determining results of charge capacity determining means determining charge capacity of a battery, electric drive-mode determining means determining a drive-mode of the vehicle, and electrical load determining means determining an electric load of the vehicle; and
   the regeneration control means increases the regeneration amount of a second electric motor when at least one of the charge capacity determining means, the electric drive-mode determining means and the electrical load determining means makes a positive determination.

2. The control device for the vehicular power transmitting device according to claim 1, wherein a case in which the electric motor is operated with priority to perform the charging and/or the electric power generation refers to a phase in which a charge capacity is less than a given value.

3. The control device for the vehicular power transmitting device according to claim 1, wherein a case in which the electric motor is operated with priority to perform the charging and/or the electric power generation refers to a phase in which the vehicle remains in an electrical drive mode.

4. The control device for the vehicular power transmitting device according to claim 1, wherein a case in which the electric motor is operated with priority to perform the charging and/or the electric power generation refers to a phase in which the vehicle has an increasing electrical load.

5. The control device for the vehicular power transmitting device according to claim 1, wherein the shifting point effectuated with the control device is a downshift point of the shifting portion.

6. The control device for the vehicular power transmitting device according to claim 1, wherein the vehicular power transmitting device further comprises an electrically controlled differential portion, disposed between the drive-force source and the drive wheels, which is operative to control an operating state of a control electric motor for thereby controlling a differential state between a rotation speed of an input shaft and a rotation speed of an output shaft, and the output shaft is connected to the shifting portion at the input side thereof.

7. The control device for the vehicular power transmitting device according to claim 1, wherein the shifting portion of the vehicular power transmitting device includes a step-variable automatic shifting portion.

8. The control device for the vehicular power transmitting device according to claim 6, wherein the electrically controlled differential portion of the vehicular power transmitting device operates to act as a continuously variable shifting mechanism.

9. The control device for the vehicular power transmitting device according to claim 1, wherein the regeneration control means cause the electric motor to generate the electric power under a coast running state or under a braking state.

10. The control device for the vehicular power transmitting device according to claim 1, wherein a case in which the electric motor is operated with priority to perform the charging and/or the electric power generation refers a turn-on of an EV switch.

* * * * *